April 10, 1934.   T. E. BOSWORTH   1,953,922
OPHTHALMIC MOUNTING
Filed April 30, 1931
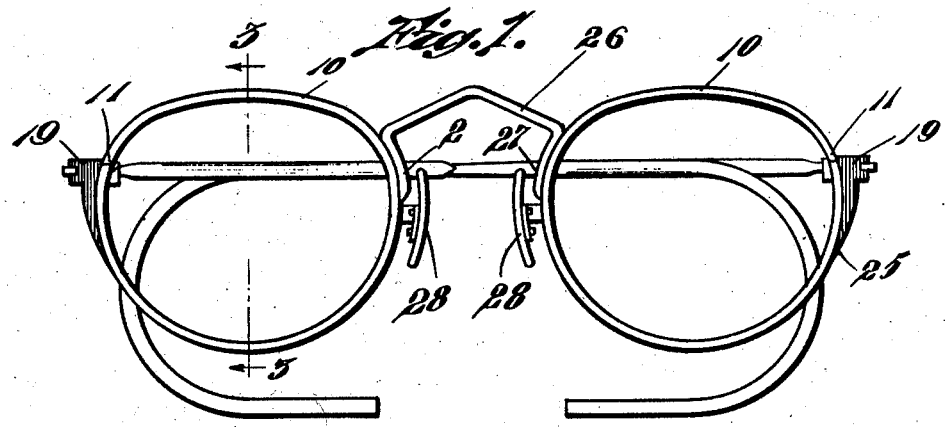
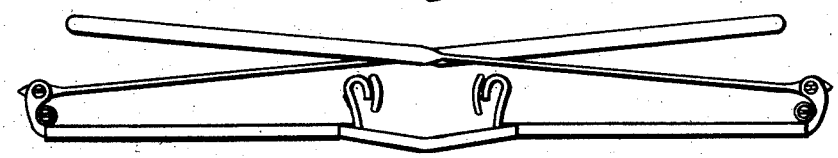
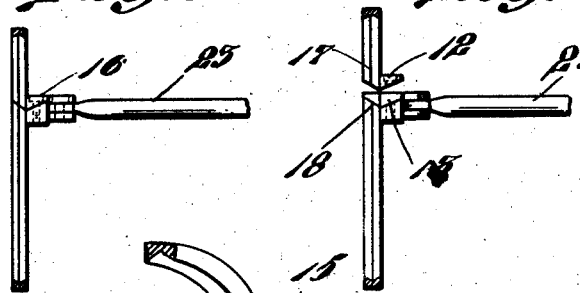 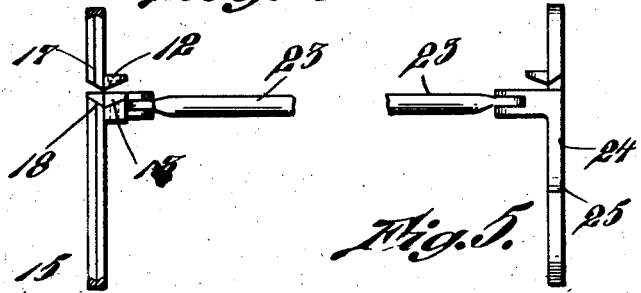
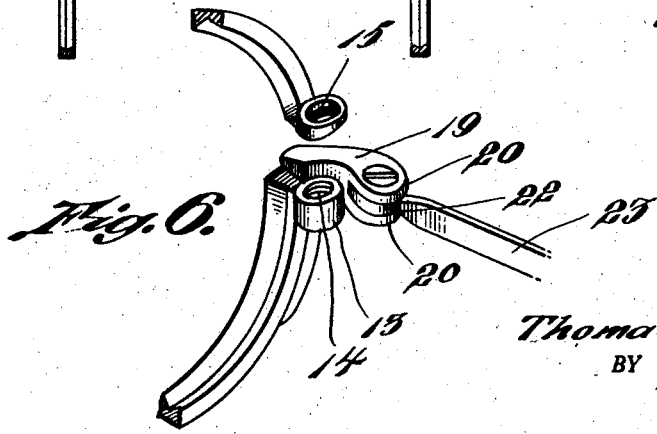
INVENTOR.
Thomas E. Bosworth
BY Barlow & Barlow
ATTORNEYS.

Patented Apr. 10, 1934

1,953,922

UNITED STATES PATENT OFFICE 1,953,922

OPHTHALMIC MOUNTING

Thomas E. Bosworth, Providence, R. I., assignor to Universal Optical Corporation, a corporation of Rhode Island Application April 30, 1931, Serial No. 533,915

10 Claims. (Cl. 88—53)

This invention relates to an ophthalmic mounting and has for its object to provide a separable lens rim, the ends of which may be connected together in such a way as to permit separation without interfering with the temple connection.

A further object of the invention is the provision of a separable lens rim in conjunction with an end piece located above the horizontal center of the lenses or above the pupils of the eye when the frame is in position on the wearer, and provide the point of separation of the end of the rim above the center of the lenses.

A still further object of the invention is to provide the connection between the rims and the temples in substantially horizontal alignment with the bridge and above the center of the lenses.

With these and other objects and advantageous features in view, the invention consists of a novel arrangement of parts more fully disclosed in the detailed description following, in conjunction with the accompanying drawing, and more particularly set forth in the appended claims.

Fig. 1 is a face view of a pair of spectacles, with my improvements embodied therein.

Fig. 2 is a top edge view thereof.

Fig. 3 is a section on lines 3—3 of Fig. 1.

Fig. 4 is a view similar to Fig. 3 showing the ends of the lens rim separated.

Fig. 5 is a side elevation of the temple with the separation as shown in Fig. 4.

Fig. 6 is an enlarged perspective view of the lens rim, its separable connection, the temple end piece, and a fragmental portion of the temple extending therefrom.

A class of spectacles have been popularized in which the temples are located above the field of vision to prevent obstruction of the vision to the side of the mountings. In order that in such a construction the temple may be connected at the point of connection of the ends of the rim and each connection may be independent, I have caused the rim to be split at a point above the temple and thus above the center of the lenses, so I may connect the temple to this end piece and may separate the rim for insertion of the lens each without disturbing the connection of the other; and the following is a detailed description of the present embodiment of this invention illustrating the preferred means by which these advantageous results may be accomplished.

With reference to the drawing, 10 designates the lens rims which are split as at 11 above the horizontal center of the rims and provided with a lug 12 on the upper end portion of the rim and a lug 13 on the lower end portion of the rim each having a bore, the lower lug 13 being threaded as at 14 and the upper lug being recessed as at 15. The lugs are connected by a screw 16 having a head to fit into the recess 15 and threadingly engaging the lug 13 and thus connect the two ends in a secure relation. The upper end portion 17 of the rim and the lower end portion 18 are inclined with reference to a horizontal and the adjoining surfaces of the lugs 12 and 13 beveled in the opposite inclination whereby a V shaped groove and projection are provided to assist in maintaining the rims in proper aligned position at the joint.

Extending outwardly from each of the lower lens rims there is an end piece 19 which extends substantially in a plane at right angles of the plane to the rims. This end piece has a bifurcated end providing ears 20 and 21 for the insertion of the joint portion 22 of the temple 23. The end piece 19 also has a portion or post 24 extending downwardly along the end portion of the rim 10 to provide an increased surface for securing the same in position. This portion or post 24 tapers off to a thin edge 25 at its lower end for merging into the rim 10.

A bridge 26 is connected as at 27 to the nose side of the rims and is substantially in a horizontal line with the end piece 19 and thus above the horizontal line of the pupils of the eye when the lenses are in position on the wearer. Nose guards 28 are secured adjacent the bridge for engagement with the nose.

By this construction I may separate the rim without removing or disturbing the temple in its connection thereto and likewise the temple may be removed without disturbing the lens mounting, which is an advantage from a practical standpoint.

I have illustrated the temples as extending at right angles to the plane of the lenses although it will be of course understood that the temples may be bent or other means provided for inclining the plane of the lenses to the temples if desired.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In an ophthalmic mounting a lens rim having separable ends for opening the same to receive the lens, the juncture of said ends being located above a horizontal extending through the pupil of the eye when the rims are in position on the face, and a temple end piece secured to the lower separable end portion of said rim and independent of the upper end portion of said rim, said end piece having a portion extending along said rim to a point on the horizontal level of the pupils of the eyes and tapering from said end piece to its termination.

2. In an ophthalmic mounting a lens rim having separable ends for opening the same to receive the lens, the juncture of said ends being located above a horizontal extending through the pupil of the eye when the rims are in position on the face, and a temple end piece secured to the lower separable end portion of said rim, said end piece having a portion extending downwardly and secured to the rim at a point on or below the horizontal level of the pupils of the eyes and tapering from said end piece to its termination.

3. In an ophthalmic mounting, a lens rim having separable ends, a tapered post extending along said rim from a point adjacent one of said ends, a temple end piece extending rearwardly from the larger upper end of said post and substantially hidden back of the same.

4. In an ophthalmic mounting, a lens rim having separable ends, a tapered post extending along said rim from a point adjacent one of said ends, a temple end piece extending rearwardly from the larger upper end of said post and substantially hidden back of the same, said end piece extending at substantially right angles to the plane of the lenses.

5. In an ophthalmic mounting, a lens rim having separable ends, a tapered post extending along said rim from a point adjacent one of said ends, a lug at the larger upper end of said post extending rearwardly therein, a lug on the other end of said lens rim to align therewith and means extending through said lugs to secure them together.

6. In an ophthalmic mounting, a lens rim having separable ends, a tapered post extending along said rim from a point adjacent one of said ends, a temple end piece extending rearwardly from the larger upper end of said post, a lug at the larger upper end of said post extending rearwardly therefrom and below the upper end of said post, a lug on the other end of said lens rim to align therewith and means extending through said lugs to secure them together, said rearward extensions being hidden by said post.

7. In an ophthalmic mounting, a lens rim having separable ends for opening the same to receive the lens, the juncture of said ends being located above a horizontal extending through the pupil of the eye when the rims are in position on the face, and a temple end piece secured to the lower separable end portion of said rim, said end piece having a portion extending downwardly along said rim and tapering from its upper end to its lower end.

8. In an ophthalmic mounting, a curved lens rim having a maximum diameter at substantially a horizontal plane through the center of the lenses with separable ends above the point of maximum diameter, a temple end piece secured to one of said separable end portions of said rim and extending along said rim downwardly away from the point of separation and tapered throughout its length and merging into the line of contour of said rim at its end.

9. A temple connection for an ophthalmic mounting, comprising a tapered post with its small end lowermost for extending along the outer edge of the lens and above the horizontal center line with its outer surface smooth and tapering off to a thin edge at its lower end, and a portion extending laterally from said post at its upper end having ears to which a temple is connected.

10. A temple connection for an ophthalmic mounting, comprising a tapered post having its smaller end lowermost for extending along the outer edge of the lens and above the horizontal center line with its outer surface smooth and tapering off to a thin edge at its lower end, a portion extending laterally from the enlarged upper end of the post, and having a pair of ears between which a temple is received.

THOMAS E. BOSWORTH.